United States Patent
Heide et al.

(10) Patent No.: US 12,050,529 B2
(45) Date of Patent: Jul. 30, 2024

(54) LOOP MODE FOR SIMULATED CONTROL UNITS

(71) Applicant: dSPACE GmbH, Paderborn (DE)

(72) Inventors: Felix Heide, Paderborn (DE); Henning Uekoetter, Paderborn (DE)

(73) Assignee: DSPACE GMBH, Paderborn (DE)

( * ) Notice: Subject to any disclaimer, the term of this patent is extended or adjusted under 35 U.S.C. 154(b) by 100 days.

(21) Appl. No.: 17/857,192

(22) Filed: Jul. 5, 2022

(65) Prior Publication Data
US 2023/0025895 A1 Jan. 26, 2023

(30) Foreign Application Priority Data
Jul. 22, 2021 (DE) .......................... 102021118943.8

(51) Int. Cl.
*G06F 11/36* (2006.01)
*G06F 11/273* (2006.01)

(52) U.S. Cl.
CPC ................ *G06F 11/3688* (2013.01)

(58) Field of Classification Search
CPC .......... G06F 11/3688; G06F 11/2733
See application file for complete search history.

(56) References Cited

U.S. PATENT DOCUMENTS 6,094,389 A * 7/2000 Ahn ................. G11C 29/02
 365/201
8,583,412 B2 * 11/2013 Kolavi ................. G06F 30/33
 703/13

(Continued)

FOREIGN PATENT DOCUMENTS

DE 10309934 B4 * 3/2005 ............. G09B 9/042
DE 102010043661 A1 * 5/2012 ............. G05B 17/02
(Continued)

OTHER PUBLICATIONS

Sebastian Gerstl "Mit vVIRTUALtarget AUTOSAR-Steuergeraete virtuell testen", Software-Implementierung, embedded-software-engineering, Fachwissen fuer Software-Professionals, VECTOR Informatik GmbH, Nov. 22, 2018, pp. 1-2, ID:45619196; www.vector.com.

(Continued)

*Primary Examiner* — Daxin Wu
(74) *Attorney, Agent, or Firm* — LEYDIG, VOIT & MAYER, LTD.

(57) ABSTRACT

A system for testing control units via simulation includes: a simulator; a host computer; and at least one connection for a communication system. At least one communication tool is stored on the system. Real control units are connectable to the system via the communication system. At least one controller is provided on the system for the connection to the communication system. Driver software for the at least one controller is stored on the system. The at least one communication tool is configured to generate communication code for communication between simulated control units and/or the real control units, wherein the communication code is configured to interact with the driver software and to relay signals and/or messages from the real and simulated control units to the driver software and to receive the signals and/or messages from the driver software. A loop mode is provided for the driver software.

12 Claims, 3 Drawing Sheets

(56) References Cited

U.S. PATENT DOCUMENTS

| | | | |
|---|---|---|---|
| 9,836,384 B2 | 12/2017 | Leinfellner et al. | |
| 10,423,571 B2 | 9/2019 | Fischer et al. | |
| 11,232,045 B2* | 1/2022 | Suevern | G06F 30/20 |
| 2002/0188433 A1* | 12/2002 | Prasad | G06F 9/451 |
| | | | 703/21 |
| 2008/0294217 A1* | 11/2008 | Lian | A61N 1/3712 |
| | | | 600/301 |
| 2009/0132057 A1* | 5/2009 | Kettu | G06F 9/5077 |
| | | | 718/1 |
| 2014/0244231 A1* | 8/2014 | Paule | G05B 23/0213 |
| | | | 703/13 |
| 2015/0082289 A1* | 3/2015 | Leinfellner | G06F 11/3664 |
| | | | 717/134 |
| 2015/0309920 A1* | 10/2015 | Ishigooka | G06F 11/3688 |
| | | | 717/126 |
| 2017/0045418 A1* | 2/2017 | Peperhowe | B60W 50/00 |
| 2018/0101501 A1* | 4/2018 | Fischer | G05B 19/042 |
| 2019/0065356 A1* | 2/2019 | Hagendorf | G06F 11/3684 |
| 2019/0065644 A1* | 2/2019 | Kronmueller | G06F 30/20 |
| 2019/0163449 A1* | 5/2019 | Hein | G06F 8/35 |
| 2019/0163452 A1* | 5/2019 | Hoffmann | G06F 8/443 |
| 2019/0227901 A1* | 7/2019 | Damet | G06F 11/3688 |
| 2022/0171697 A1* | 6/2022 | Moukahal | G06N 5/048 |

FOREIGN PATENT DOCUMENTS

| | | | |
|---|---|---|---|
| DE | 102014110096 A1 | 3/2015 | |
| DE | 102016119320 A1 | 4/2018 | |
| DE | 102019106551 A1 | 5/2019 | |
| JP | 2018067282 A * | 4/2018 | G05B 19/41835 |

OTHER PUBLICATIONS

VECTOR Informatik GmbH "Virtuelle AUTOSAR-Steuergeraete effizient erzeugen und testen", Case Study vVIRTUALtarget, V2.0, Dec. 2020, p. 1, www.vector.com.

VECTOR Informatik GmbH "CANoe Produktinformation", V6.4, Oct. 2021, pp. 1-62, www.vector.com.

VECTOR Informatik GmbH "CANoe Product Information", V6.4, Oct. 2021, pp. 1-61, www.vector.com.

* cited by examiner

LOOP MODE FOR SIMULATED CONTROL UNITS

CROSS-REFERENCE TO PRIOR APPLICATIONS

This application claims benefit to German Patent Application No. DE 102021118943.8, filed on Jul. 22, 2021, which is hereby incorporated by reference herein.

FIELD

The invention relates to a system for testing control units via simulation, wherein the system is configured to connect real and simulated control units via a communication system (bus system or network) such that a control-unit group can be simulated via the system for test purposes, wherein the system comprises a simulator, in particular a hardware-in-the-loop simulator (HIL), and a host computer as well as at least one connection for the communication system, wherein at least one communication tool is stored on the system, wherein the real control units can be connected to the system via the communication system, wherein at least one controller is provided on the system for the connection to the communication system, wherein driver software for the controller is stored on the system, wherein the communication tool is configured to generate communication code for the communication between the simulated control units and/or the real control units, wherein the communication code is configured to interact with the driver software and to relay signals and/or messages from the control units to the driver software and to receive signals and/or messages from the driver software.

In addition, the invention relates to a method for testing control units and to a configuration tool for use in the system and in the method.

BACKGROUND

Systems for testing control units via simulation are, for example, known as hardware-in-the-loop (HIL) systems for testing control units, in particular in the automotive field, with real control units being connected to a real-time simulator in order to allow their functionality to be tested even in an early development phase of the vehicle. In the process, the real control units are connected to the HIL system via the same communication system as is also provided in the vehicle. The communication system can, for example, be a bus system (CAN, LIN, FlexRay, etc.) or a network (Ethernet, etc.). However, a control unit that is intended to be installed in a vehicle not only has to be tested on its own, but also together with other control units of the vehicle. Often, the control units are not yet all actually available in the development phases of the vehicle. In order to allow the communication of control units in a group to be tested as early as possible in a realistic manner, executable models of individual control units of the group are created, e.g., via a modeling tool which replaces the real control units in the form of simulated control units in the simulation of the overall system. One example of a modeling tool of this kind is Simulink® from Mathworks®. Here, "simulation of the overall system" means that all the signals and messages relevant to the control units to be tested are generated as part of a simulation. Corresponding simulation code is executed on a simulation computer (simulator) connected to the real control units. As a rule, the simulator is a special real-time computer, but for some purposes a suitable simulator on a PC can also be used. The simulation code allows the simulator to generate and/or process the signals required for testing the control units and corresponding messages for sending the signals. This can be extensive code for also simulating the essential parts of the vehicle and the surroundings, but it can also just be "communication code," i.e., code that controls the communication, e.g., the sending and receiving of the signals, in accordance with corresponding triggers or cycle times. However, the communication code can, for example, also contain sections of code for initializing system parameters (signals, messages, variables, etc.), and options for manipulating or displaying signals or messages in the system. Here, the communication code can relate to the communication between the real control units and/or between the real and simulated control units and/or only between the simulated control units, depending on which control units are incorporated in the overall simulation. As a rule, for creating the communication code, a communication tool for bus or network systems is stored. This is software that provides corresponding options for configuring the communication code and/or for accessing signals and messages in the communication code. Where a communication tool is mentioned herein, at least one tool is meant. A plurality of tools could also be meant, which can also interact with one another or perform different tasks. At least one configuration tool is stored for configuring the communication and creating the communication code and initializing system parameters (signals, messages, variables, etc.), via which tool the user can also configure their access to system parameters. One example of this would be ConfigurationDesk® from dSPACE GmbH. However, additional tools for further access to and the display (monitoring) of messages and signals can also be meant, for example communication tools such as ControlDesk® or BusNavigator®, also from dSPACE GmbH.

However, a problem arises with these communication tools when the communication is intended to run purely between simulated control units. This is because these communication tools are designed for communication via a real communication system and require at least two real controllers to be incorporated in the communication and to communicate with one another. It may, however, be desirable first of all to test the communication only for simulated control units and then to expand this to real control units, or to replace all the real control units with simulated control units during the simulation, or vice versa. If the controller on the system then does not have a real counterpart (communication partner) in the communication system, the entirety of the communication comes to a halt or cannot even be initiated in the first place.

SUMMARY

In an exemplary embodiment, the present invention provides a system for testing control units via simulation. The system is configured to connect real and simulated control units via a communication system for simulating a control-unit group via the system. The system comprises: a simulator; a host computer; and at least one connection for the communication system. At least one communication tool is stored on the system. The real control units are connectable to the system via the communication system. At least one controller is provided on the system for the connection to the communication system. Driver software for the at least one controller is stored on the system. The at least one communication tool is configured to generate communication code for communication between the simulated control units and/or the real control units, wherein the communication code is configured to interact with the driver software and to relay signals and/or messages from the real and simulated control units to the driver software and to receive the signals and/or messages from the driver software. A loop mode is provided for the driver software, wherein the loop mode is provided in that input signals or incoming messages received by the driver software from the simulated control units are buffered in a memory and returned again as output signals or outgoing messages.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
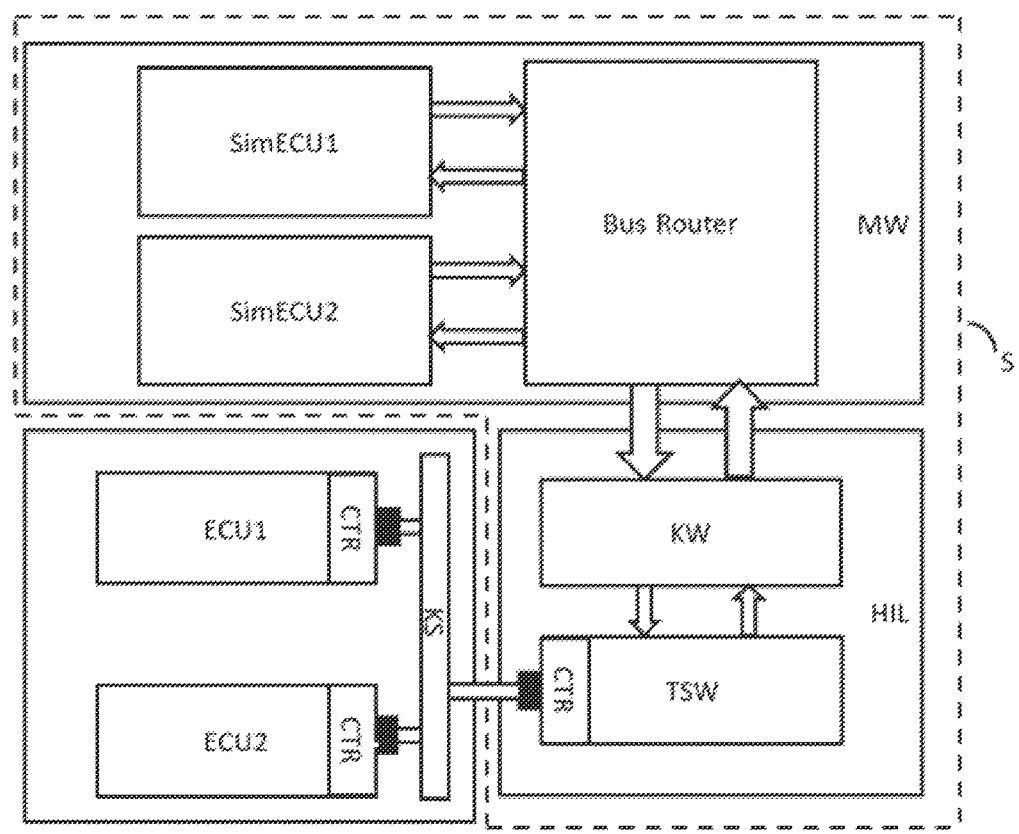
FIG. 1 is a schematic view of a system S comprising real and simulated control units ECU1, ECU2, SimECU1, SimECU2 according to the prior art.

In an exemplary embodiment of the invention, a loop mode is provided for the driver software, wherein the loop mode is provided in that the input signals (or incoming messages) received by the driver software from the simulated control units (i.e., via the communication code generated by the communication tool) are buffered in a memory and returned again (via the communication code generated by the communication tool) to the simulated control units as output signals (outgoing messages).

Preferably, a software switch is also stored for the driver software in order to transfer the driver software into the loop mode.

The driver software for the controller on the system is either contained in the system in a pre-installed manner or it is generated via the communication tool and its code generator for the communication code. Likewise, the loop mode according to the invention is included in the driver software as standard (at least partially) and is configured via the configuration tool, and/or the code for the loop mode (and a corresponding switch) is also generated (at least in part) by the code generator of the communication tool.

The loop mode is substantially provided for the case in which only simulated control units are still intended to communicate with one another in the simulation, i.e., for the case in which the system does not receive any further signals from real control units via its controller because the connections of the real control units to the communication system are not active and therefore the controller of the system is lacking a counterpart.

An advantage of the invention is that communication can be simulated without a controller having to be actively involved and that the communication code is nevertheless configured and created while taking the real controller into account, such that, using a switch for the loop mode, it is possible to flexibly set whether or not real control units and their corresponding controllers are involved in the simulation. Therefore, all the real control units can also be added in or replaced with simulated control units during the simulation.

In a preferred embodiment, the simulator is a real-time hardware-in-the-loop simulator (HIL).

In an alternative embodiment, the simulator is stored as a program on the host computer.

A simulated control unit is, for example, provided by a more or less elaborate, executable model of a real control unit. The model can, for example, be stored in a modeling tool on the host computer or in the form of executable code on the real-time HIL simulator, the executable code on the simulator also being able to be generated, for example, from the executable model on the host computer and downloaded from there onto the simulator.

Preferably, the communication system is provided by a bus system (e.g., CAN, LIN, or FlexRay) or by a network, e.g., Ethernet. The communication system can be formed from a plurality of these systems, and therefore, for example, some real control units are connected to the system via Ethernet while others are connected to the system via a CAN bus.

The communication tool is preferably stored in part on the HIL simulator (namely in the form of the communication code for the direct access to the communication running via the HIL simulator) and in part on the host computer (for the interaction with the user).

The communication tool is provided by a tool for configuring the communication and/or for initializing the communication and/or for manipulating the messages or signals in the messages during the communication and/or for displaying communication messages or the signals contained therein. The loop mode according to the invention is included in the configuration of the communication via the communication tool (by configuration and/or code generation) and allows access to the messages and signals in the messages by the communication tool. According to the invention, just one communication tool is required for generating the communication code, but further communication tools can use the functionality of the loop mode. Because, due to the loop mode, the driver software, which normally causes messages to be sent and received via the controller, undertakes this task even without the controller, other communication tools, for example for displaying messages/signals, can also access the communication as if a controller were active.

Preferably, for the configuration of the communication via the communication tool, a controller to be taken into account for the generation of the communication code can be specified for the driver software, even if this controller is not yet physically present in the system. For example, in the software of the communication tool, a particular controller can be selected from a list of different types of controller. As a result, when the controller is retrofitted, a configuration can continue to be used when said controller is activated and the driver software is transferred from the loop mode into a mode for the use of the controller.

The communication for the simulated control units is configured either in a modeling tool or in the communication tool, wherein one configuration can be specified per control unit or per control-unit group.

Modeling tools often also provide various options for modeling bus communication and signal routing. It can be advantageous to define the communication as early as in a model for the control unit in question. On the other hand, it is sometimes also desirable to define the configuration of the communication (i.e., the signal routing, inter alia) in a central communication tool, separately from the modeling tool.

The invention will now be described in more detail with reference to the drawings, in which like parts are designated by the same reference signs. The embodiments are illustrated highly schematically, i.e., they make no claim to completeness.

FIG. 1 shows a system S for testing control units according to the prior art in which, for simulation purposes, real control units ECU1, ECU2 and simulated control units SimECU1, SimECU2 are connected via a hardware-in-the-loop simulator HIL, the real control units ECU1, ECU2 being connected to the simulator HIL via a communication system KS, e.g., a CAN bus. A controller CTR, which controls the sending and receiving of messages (and potentially the signals contained therein), is provided at each connection for a subscriber of the communication system. In a CAN system, at least two controllers CTR have to be active so that communication can take place.

The simulated control units SimECU1, SimECU2 are incorporated in the simulation of the entire control-unit group via a simulated bus (indicated by arrows). The bus router for the simulated control units SimECU1, SimECU2 is also modeled in software here, and specifically on a host computer (not explicitly shown here) via a modeling tool MW, e.g., Simulink® from The Mathworks®. To execute the simulation, C code or a corresponding compiled program can be generated from the modeling software, for example, and loaded onto the simulator HIL from the host computer. In FIG. 1, the simulated control unit SimECU1 is a simplified model of the real control unit ECU1, and the simulated control unit SimECU2 is a simplified model of the real control unit ECU2. One application is to replace the real control unit ECU1, ECU2 in the simulation with the corresponding simulated control unit SimECU1, SimECU2 or to switch between a real and a simulated control unit. Of course, further simulated control units for which no corresponding real control unit is connected, and vice versa, can also be included in the simulation.

Figure 2:
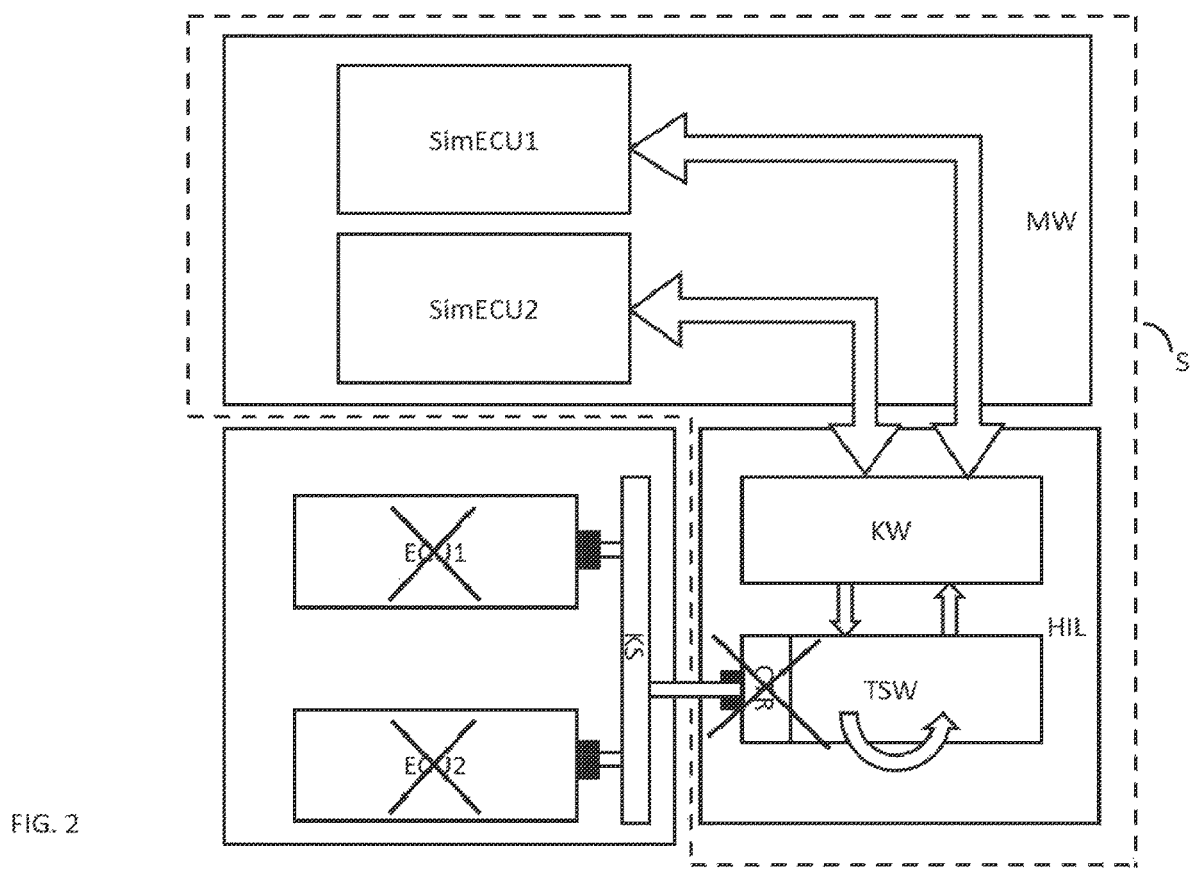
FIG. 2 is a schematic view of a first embodiment of a system S according to the invention.

FIG. 2 shows an embodiment of the system S according to the invention in which no real control units ECU1, ECU2 are active in the system S. The communication takes place only between the simulated control units SimECU1 and SimECU2, although in this case the communication is still simulated on the simulator HIL and controlled via the communication tool KW or the simulation code generated thereby. Via the loop mode according to the invention in the driver software TSW, here, too, the communication runs via the driver software TSW for the controller CTR found on the simulator, which controller, however, cannot become active for want of a counterpart. In the loop mode, the controller CTR is not required for the simulation. A different type of controller can even be specified in the configuration.

In FIG. 2, the communication tool KW is stored centrally on the simulator HIL, such that configurations, initializations, etc. take place together for all the simulated control units SimECU1 and SimECU2 and "monolithic" communication code is generated.

Figure 3:
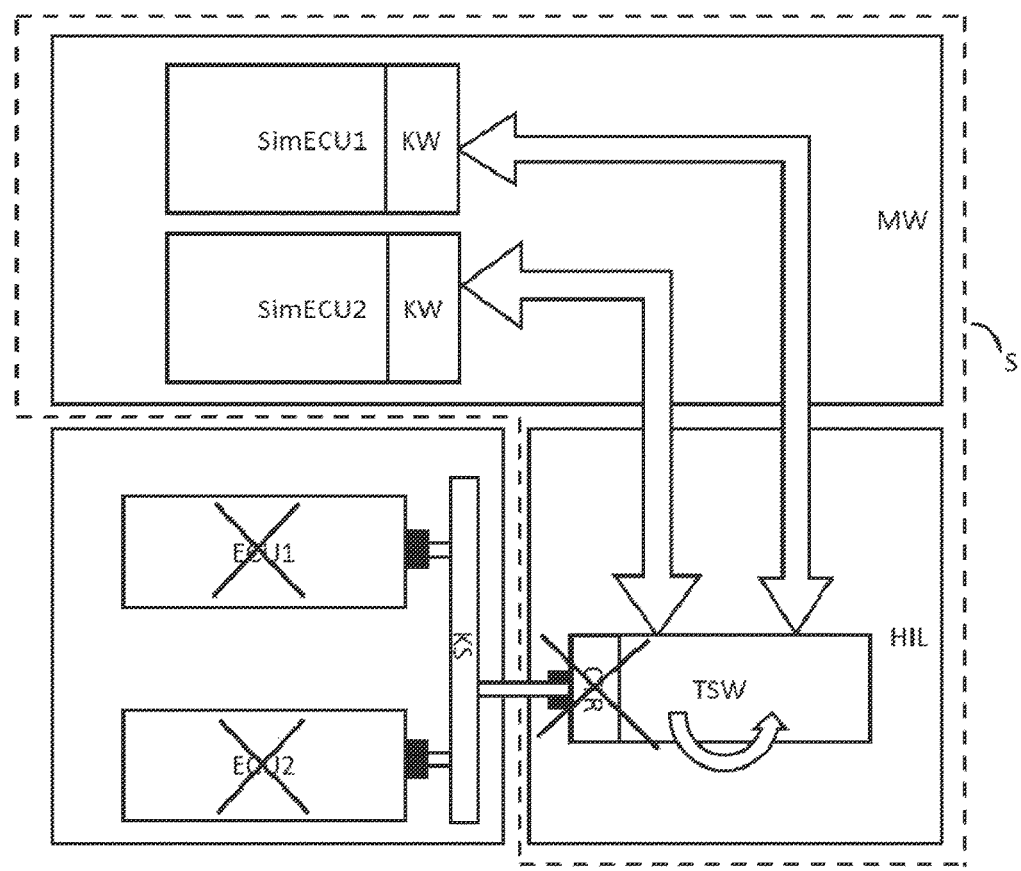
FIG. 3 is a schematic view of a second embodiment of a system S according to the invention.

As an alternative, FIG. 3 shows that configurations take place in a decentralized manner and separately for each simulated control unit SimECU1 and SimECU2 via the configuration tool KW. Therefore, configurations for individual control units can be reused in a modular manner.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A system for testing control units via simulation, wherein the system is configured to connect real and simulated control units via a communication system for simulating a control-unit group via the system, wherein the system comprises:
   a simulator;
   a host computer; and
   at least one connection for the communication system;
   wherein at least one communication tool is stored on the system;
   wherein the real control units are connectable to the system via the communication system;
   wherein at least one controller is provided on the system for the connection to the communication system;
   wherein driver software for the at least one controller is stored on the system;
   wherein the at least one communication tool is configured to generate communication code for communication between the simulated control units and/or the real control units, wherein the communication code is configured to interact with the driver software and to relay signals and/or messages from the real and simulated control units to the driver software and to receive the signals and/or messages from the driver software;
   wherein the driver software is configured to operate in a normal mode in which messages sent to and received by the driver software are sent and received via the at least one controller; and
   wherein the driver software is further configured to operate in a loop mode in which input signals or incoming messages are received by the driver software from the simulated control units without the at least one controller, are buffered in a memory, and are returned again as output signals or outgoing messages without the at least one controller.

2. The system according to claim 1, wherein a software switch is stored for the driver software in order to transfer the driver software into the loop mode.

3. The system according to claim 1, wherein a simulated control unit is provided on the host computer by an executable model of a real control unit or is stored on the real-time hardware-in-the-loop simulator in the form of executable code.

4. The system according to claim 1, wherein the at least one communication tool is stored in part on the hardware-in-the-loop simulator and in part on the host computer.

5. The system according to claim 1, wherein the simulator is a real-time hardware-in-the-loop simulator.

6. The system according to claim 1, wherein the simulator is stored as a program on the host computer.

7. The system according to claim 1, wherein the communication system is provided by a controller area network (CAN), local interconnect network (LIN), FlexRay, or Ethernet system.

8. The system according to claim 1, wherein the at least one communication tool is provided by a tool for configuring the communication and/or for initializing the communication and/or for manipulating the signals and/or messages in the communication during the simulation and/or for displaying communication signals and/or messages.

9. The system according to claim 1, wherein the driver software for the at least one controller is generated via the at least one communication tool for the simulation.

10. The system according to claim 1, wherein for the configuration of the communication via the at least one communication tool, the driver software is configured to specify a controller to be considered for the generation of the communication code, wherein the controller is not yet physically present in the system.

11. The system according to claim 1, wherein the communication for the simulated control units is configured either in a modeling tool or in the at least one communication tool, and wherein one configuration is specifiable per control unit or per control-unit group.

12. A method for testing control units via simulation, wherein, for the purpose of simulating a control-unit group, real and simulated control units are connected via a system and a communication system connected thereto, wherein the system comprises a simulator and a host computer as well as at least one connection for the communication system, wherein at least one communication tool is stored on the system, wherein the real control units are connected to the system via the communication system, wherein at least one controller is provided on the system for the connection to the communication system, and wherein driver software for the at least one controller is stored on the system, the method comprising:

generating, by the at least one communication tool, communication code for communication between the simulated control units and/or the real control units;

interacting, by the communication code, with the driver software to relay signals from the control units to the driver software and to receive said signals from the driver software;

operating, by the driver software, in a normal mode in which messages sent to and received by the driver software are sent and received via the at least one controller; and operating, by the driver software, in a loop mode in which input signals are received by the driver software from the simulated control units without the at least one controller, are buffered in a memory, and are returned again as output signals without the at least one controller.

* * * * *